Sheet 1. 2 Sheets.
Howe & Grannis.
Heddle.
No. 39.
Reissued May 30. 1842.
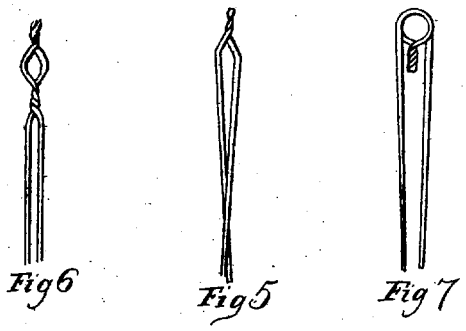
N. PETERS, PHOTO-LITHOGRAPHER, WASHINGTON, D. C.

UNITED STATES PATENT OFFICE.

ABRAHAM HOWE AND SIDNEY S. GRANNIS, OF MORRISVILLE, NEW YORK.

IMPROVED MANUFACTURE OF WIRE HEDDLES FOR WEAVERS' HARNESS.

Specification forming part of Letters Patent No. 2,299, dated October 11, 1841; Reissue No. 39, dated May 30, 1842.

*To all whom it may concern:*

Be it known that we, ABRAHAM HOWE and SIDNEY S. GRANNIS, of Morrisville, in the county of Madison and State of New York, have invented a new and improved manufacture of wire heddles for the forming or making of harness to be used in the process of weaving; and we do hereby declare that the following is a full and exact description of our said new heddles.

Heddles made of wire have long been known and used in the forming of weavers' harness. We do not, therefore, claim to be the inventors of heddles made of this material; but they have hitherto been made, and as we believe in all instances, in two parts, of separate pieces of wire connected at or near the center of each heddle by a loop-joint in the vicinity of the eye through which the threads or warp pass when weaving is to be effected. Our heddles, on the contrary, are made without a joint of the kind above referred to, and we, in general, make them out of a single piece of wire of double the length of the heddle; but they may be equally well made of two pieces. By our mode of constructing or forming the heddles they are made with greater facility than when formed with a joint in their middles, are more convenient in use, more durable, and less liable to get out of order.

For the manufacture of our improved heddles, as well as of those made with a joint, we have invented a new machine, for the construction and use of which we have obtained Letters Patent of the United States, and although such heddles may be made with special facility by the use of said machine, they may also be made continuous and without a joint by other means; and as we verily believe that the so making them is an entire new manufacture, we do not intend to limit or confine ourselves to any particular method of or means for twisting the wires so as to form the loops or eyes which they are to contain, although in the description of the machine above referred to we have pointed out what we believe to be the best method of so doing.

In the accompanying drawings we have represented two wire heddles as heretofore made by uniting the two wires of which they are formed by means of a joint, and we have also shown two heddles, each made of one entire piece of wire upon our plan.

Figures 1 and 2 represent two heddles of the ordinary kind, which are similar to each other in all respects excepting that the heddle shown in Fig. 2 has two loops or eyes near its middle, while in Fig. 1 there is only one eye represented. Figs. 3 and 4 represent two of our improved heddles. In these the loop or eye in the center is formed by twisting the wire at each end of said loop or eye, as represented, and, if desired, two such loops or eyes may be formed by similar means on each heddle.

The only difference between the heddles shown in Figs. 3 and 4 is in the formation of the end eye.

*a* in Fig. 3 is a complete circle, while at *b* in Fig. 4 it is merely bent round staple fashion.

When our improved heddles are each made of two pieces of wire, the end eyes will be formed at each end in the manner shown at *c c*.

Should it be found necessary to give greater strength to the eye or loop, which is formed by the twisting of the ends of the wires round in the manner shown at *c c* in the respective figures, the said ends may be rendered perfectly secure from being straightened and pulled off from the wires on which they are strung on the heddle-shafts by twisting the ends of said wire together spirally in the manner represented in Figs. 5, 6, and 7 in the accompanying drawings. In Fig. 5 the two ends are shown as merely twisted together. In Fig. 6 the twist is represented as double, so as to form an eye, as does that also shown in Fig. 7. These may serve as exemplifications of the different modes in which the same may be effected.

Although we, in general, make each of our heddles of one continuous piece of wire and form the eye or loop at one end, as shown at *a b*, Figs. 3 and 4, they may be made of two pieces of wire, each piece being continuous from end to end of the heddle, and the eyes at the ends being formed as shown at *c c* or in Figs. 5, 6, and 7.

Having thus fully described the nature of our invention of a new manufacture of wire heddles, what we claim therein, and desire to secure by Letters Patent, is—

The making of such heddles in one continuous piece from end to end without a joint, and this we claim whether said heddles be made of one entire piece of wire recurved at one end to form the end eye, or of two pieces of wire, each having the end eye formed by twisting the ends of the wires round in either of the modes herein described, or in any other effecting the same purpose by like means.

ABRAHAM HOWE.
SIDNEY S. GRANNIS.

Witnesses:
LEWIS CHAPPELL,
WM. W. FORWELL.